United States Patent
Kea, Jr. et al.

(10) Patent No.: US 7,644,544 B2
(45) Date of Patent: Jan. 12, 2010

(54) COMPACT SECURITY SHELTER DEVICE FOR MOTORCYCLES, BICYCLES, FOUR-WHEELERS AND OTHER SMALL PERSONAL TRANSPORTATION VEHICLES

(76) Inventors: Harry Edwin Kea, Jr., 2512 Rolling Pines Rd., Columbia, SC (US) 29210; Dewaine Scott Kea, 109 Racquet Rd., Chapin, SC (US) 29036; David Barry Kea, 168 S. Well Rd., Columbia, SC (US) 29210

( * ) Notice: Subject to any disclaimer, the term of this patent is extended or adjusted under 35 U.S.C. 154(b) by 291 days.

(21) Appl. No.: 11/306,978

(22) Filed: Jan. 18, 2006

(65) Prior Publication Data

US 2006/0196125 A1 Sep. 7, 2006

Related U.S. Application Data

(60) Provisional application No. 60/593,480, filed on Jan. 18, 2005.

(51) Int. Cl.
*E04B 1/346* (2006.01)
*E04B 7/16* (2006.01)
*E04H 1/00* (2006.01)
*E04H 3/00* (2006.01)

(52) U.S. Cl. .................. 52/66; 52/71; 52/72; 52/79.1

(58) Field of Classification Search ............. 52/66, 52/19, 67, 71, 72, 79.1, 174
See application file for complete search history.

(56) References Cited

U.S. PATENT DOCUMENTS

| | | | | |
|---|---|---|---|---|
| 3,949,528 A | * | 4/1976 | Hartger et al. | 52/79.1 |
| D286,431 S | * | 10/1986 | McDaris et al. | D25/1 |
| 4,876,832 A | * | 10/1989 | Wasserman | 52/79.1 |
| 4,894,832 A | * | 1/1990 | Colak | 372/44.01 |
| 4,982,971 A | * | 1/1991 | Marin | 280/30 |
| 6,341,451 B1 | * | 1/2002 | Morton, Sr. | 52/64 |
| 6,345,471 B1 | * | 2/2002 | Gyllenhammar | 52/69 |

* cited by examiner

*Primary Examiner*—Basil Katcheves
*Assistant Examiner*—Branon C Painter
(74) *Attorney, Agent, or Firm*—Calhoun Thomas, III; Samuel Alexander Long, Jr

(57) ABSTRACT

The invention is an apparatus that can be temporarily or permanently secured to the ground or other flat surface to provide a clam-shell like housing for storage of a personal transportation vehicle such as a motorcycle, bicycle, or a four-wheeler. It protects the vehicle from rain and other damaging weather and from persons who might wish to steal the vehicle or otherwise damage or vandalize it. It also prevents passers-by from taking stored or other items left with the vehicle. The user can, in most cases, ride the vehicle into the unit and then securely lock the lid down to the lower half of the unit.

1 Claim, 5 Drawing Sheets

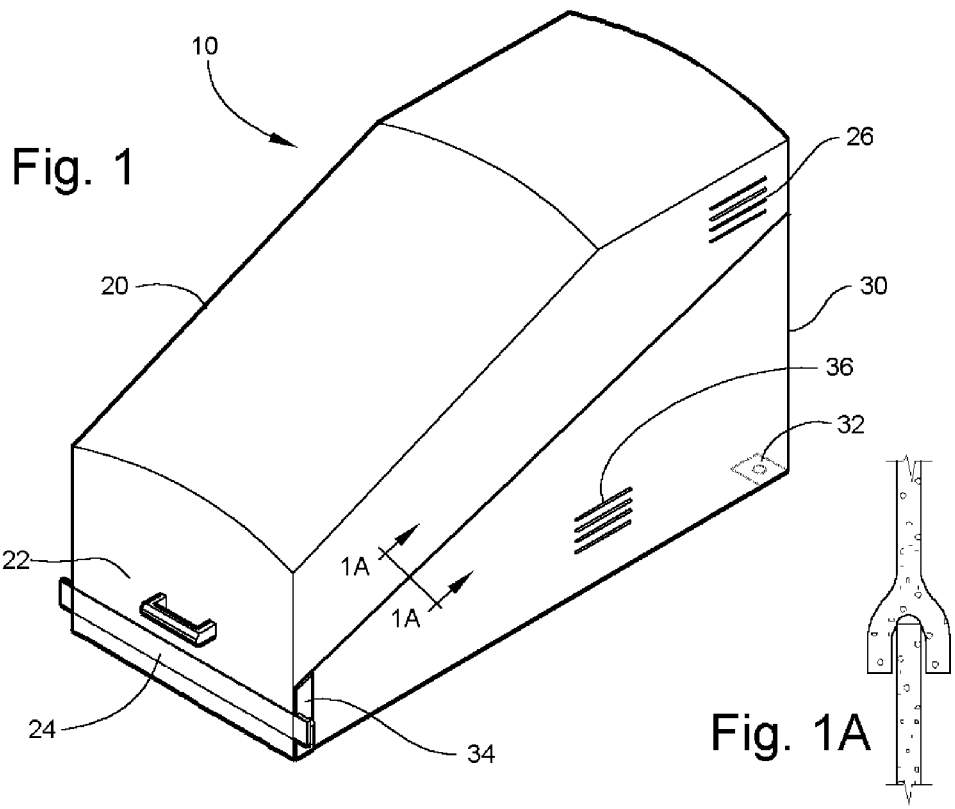
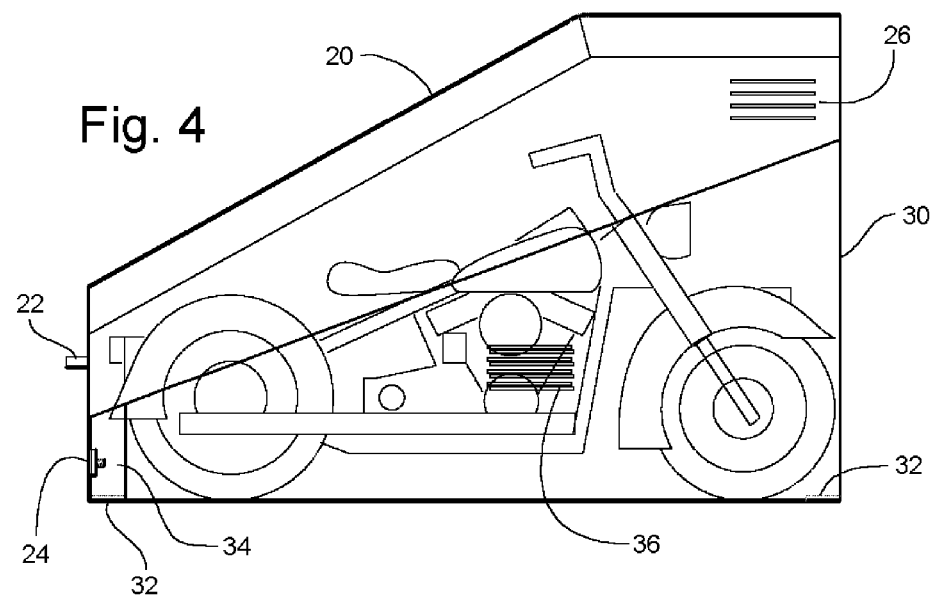

COMPACT SECURITY SHELTER DEVICE FOR MOTORCYCLES, BICYCLES, FOUR-WHEELERS AND OTHER SMALL PERSONAL TRANSPORTATION VEHICLES

RELATED APPLICATIONS

Not Applicable.

FEDERALLY SPONSORED RESEARCH OR DEVELOPMENT

Not Applicable.

REFERENCED OR INCORPORATED MATERIAL

Not Applicable.

BACKGROUND OF INVENTION

The present invention relates to providing riders of motorcycles, bicycles, four-wheelers and other small personal transportation vehicles with a compact security shelter device. People often use motorcycles, bicycles and other vehicles for personal transportation. When a rider arrives at a destination or location such as an office, a recreational facility, a motel or even their residence, they rarely if ever have any means of securely protecting their vehicle. Their only choice typically is to park in an uncovered parking space with no security or protection from the elements or vandalism. Often they look for a fixed, immovable object that they might be able to chain or cable the vehicle to so that it (or at least most of it) will still be there when the rider returns. Unprotected motorcycles are often subject to people attempting to remove any items left on the motorcycle and unlocked bicycles are easily stolen or damaged. The present focus of this invention is the development of a new, inexpensive and secure way of protecting these personal transportation devices. To be most effective, such a device should conform generally to the approximate size and shape of such personal transportation vehicles so as not to take up excess space.

SUMMARY OF THE INVENTION

According to its major aspects and broadly stated, the present invention is a protective unit for motorcycles, bicycles, four-wheelers and similarly small personal transportation vehicles. This invention is designed to be used at motels, recreational facilities, homes, offices and similar places where people might need to protect their small personal transportation vehicle from thefts and the elements. This invention is designed with a means of securely locking the stored vehicle inside and securely anchoring the unit to the ground. The lid is designed to be light weight and to have spring loaded shocks that assist the user in raising or lowing the lid.

BRIEF DESCRIPTION OF THE SEVERAL VIEWS OF THE DRAWINGS

FIG. 1 is an angled view of the front and side of the invention (10);

FIG. 1A is a cross-sectional view of how the edge of the lid meets the bottom of the unit;

FIG. 4 is a side view of the invention (10) showing the location of the vents (26, 36) and a cut-away image of a motorcycle closed up inside the invention (10);

DETAILED DESCRIPTION

Figure 2:
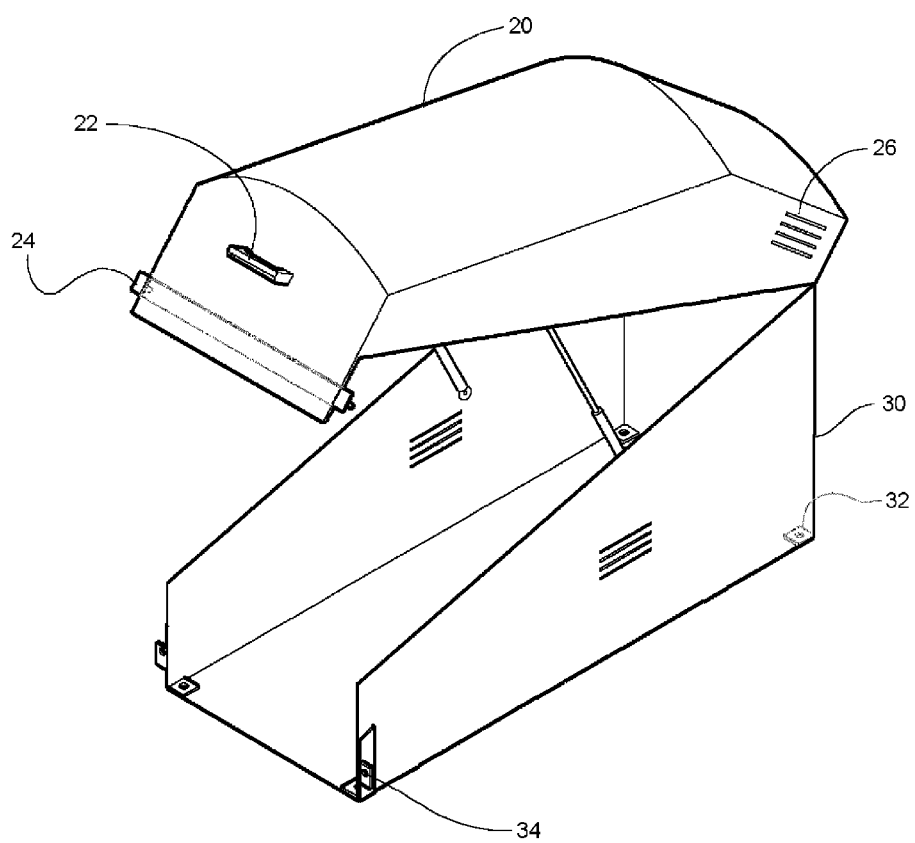
FIG. 2 is a similarly angled view of the invention (10) with the top (20) raised.
Figure 3:
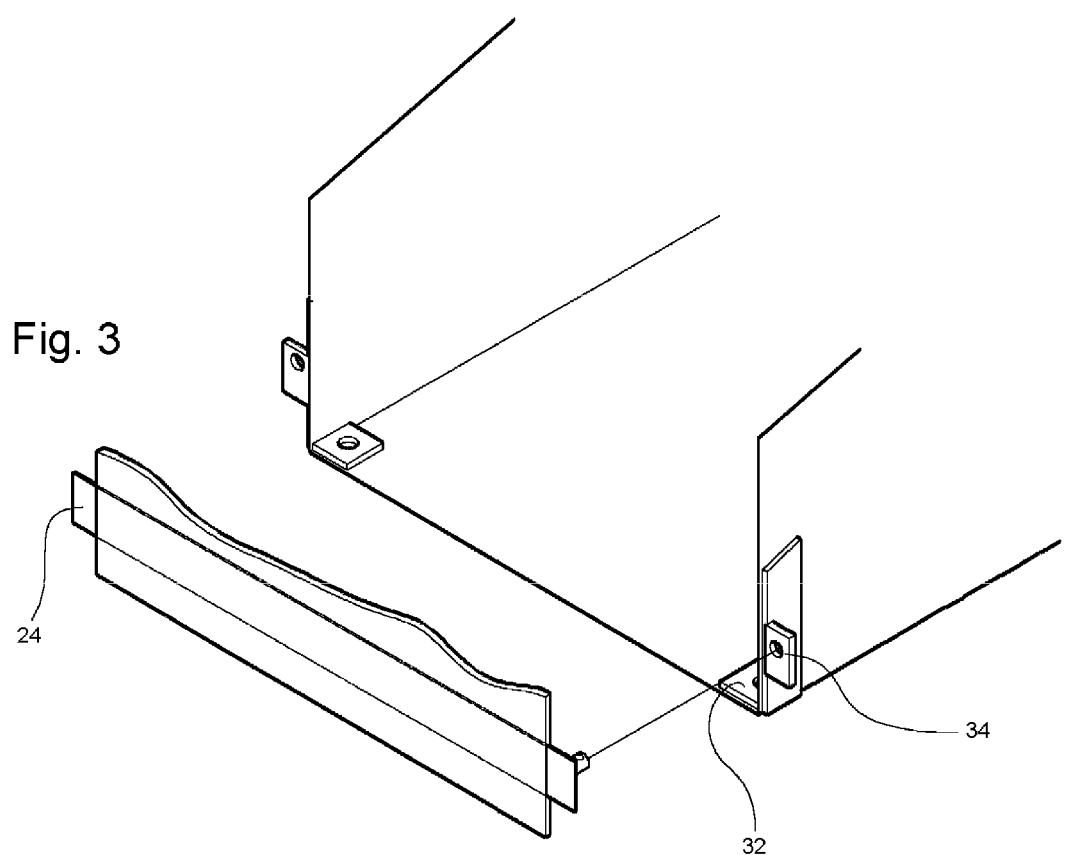
FIG. 3 is a close-up view of the security locking mechanism (24)
Figure 5:
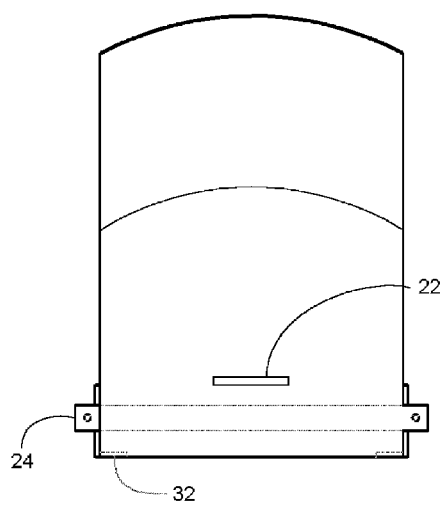
FIGS. 5 and 6 are front and rear views of the invention (10) with FIG. 5 showing the sloping and curved roof line FIG. 6 showing the line where the top of the invention is attached to the bottom by a hinge mechanism (40)
Figure 6:
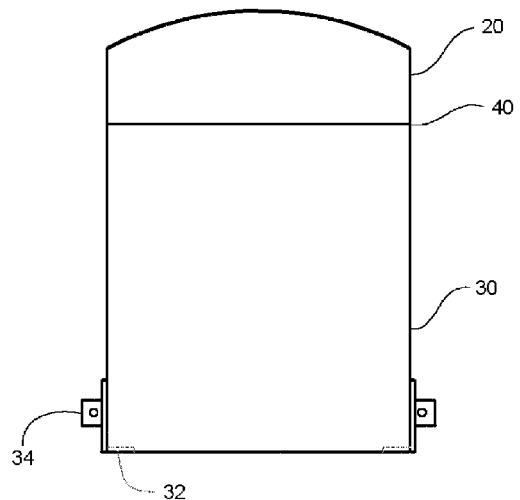
Figure 7:
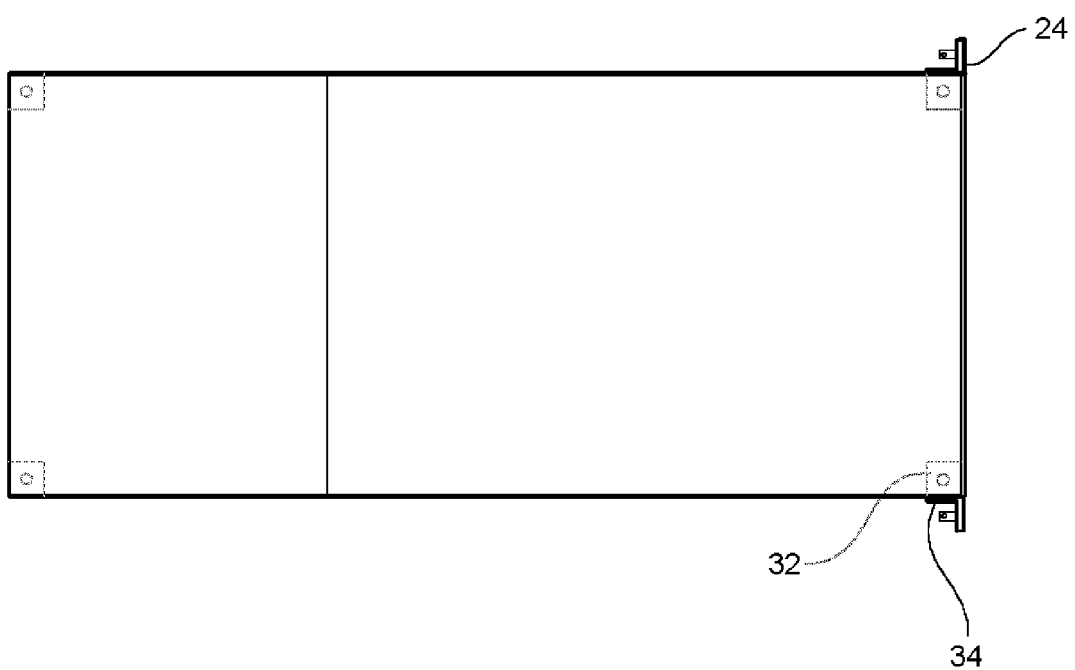
FIG. 7 is a top down view of the invention.

The front view of the current preferred embodiment of the apparatus is shown in FIG. 1. In the open position, shown in FIG. 2, this "clam-shell" style invention provides users with the opportunity, in most cases, to ride their motorcycle or bicycle or similar personal transportation device directly in to the unit (10). There the rider will typically put down a kickstand or other device to stand the vehicle up in the unit. An additional embodiment of the invention includes an alignment brace for the front wheel that may be used to keep the vehicle upright in the unit.

There are vents located on each side of the unit in both the bottom (36) and the upper halves (26) for purposes of airflow to avoid a buildup of fumes or heat in the unit. Gas or similar compression cylinders facilitate the lifting of the upper half of the device or the lid as it will be commonly be called. Through the use of these support cylinders, the lifting of the lid mechanism is made less heavy than it would otherwise be and when lowering the lid the dampening effect produced by the cylinders keeps the lid from smashing down. The preferred embodiment includes a sloping roof (20) to make a modest reduction in materials and thus the weight of the lid. The lid can be locked down (34) to the lower half of the unit by a standard locking mechanism (24).

In its preferred embodiment, this invention is manufactured from extruded plastic or fiberglass and has a weight that allows it to be moved into place by one or two people. Typically the unit is attached or secured to the ground or other surface it sits on, but this is not a requirement and temporary use may not involve attachment. It has few moving parts and a molded handle (22) for simple operation. The molded floor of this invention includes lock-down plates (32) that are located on the interior of the unit so that they cannot be tampered with for security purposes. Cork-screw type pins that are capable of being tightened or loosened by hand pass through these lock-down plates (32) at the interior four corners of the unit. When inserted into a dirt surface and tightened, these pins make it more difficult to move or remove the unit with its enclosed transportation vehicle. Alternatively, other devices such as stakes or bolts can be used to anchor the unit to dirt, concrete, asphalt or other surfaces without changing the nature of the invention. Additionally, the hinge (40) between the upper shell (20) and the bottom half (30) of the unit is located on the interior for security purposes as this reduces the chance that a criminal can gain access through removal of the pin in said hinge (40). This invention will keep the motorcycle, bicycle or other vehicle out of the weather and provide security from theft or vandalism through its lid locking mechanism (24).

In a further embodiment of the invention, it provides additional security through including a security alarm system similar to that of a car, except that it would be deactivated by the user entering a code within a short period (estimated to be approximately 10 to 15 seconds) after opening the lid.

This invention hides the type of personal transportation device from the eyes of a person passing by. It can be made mobile where it is not permanently affixed to the ground so that it can be transported from location to location in the back of a truck or similar vehicle. This mobility can be especially helpful in circumstances where for example a user goes to a rally or similar gathering and wishes to have this protective unit available for their motorcycle, bicycle or similar personal transportation vehicles while at the event.

What is claimed is:

1. A secure shelter for a personal transportation vehicle comprising:

a base for supporting the personal transportation vehicle, said base having a floor, a front opening that permits riding the vehicle into the enclosure, a left base wall, a rear base wall, and a right base wall; a lid hingedly attached to said base and movable between an open position and a closed position, said lid having a front lid wall, a top, said top sloping downwards, relative to level ground when the secure shelter is positioned on level ground, toward the front lid wall, a left lid wall, a rear lid wall, and a right lid wall, said left, rear, and right lid walls securely meshing with said left, rear, and right base walls when in the closed position, the bottom of the front lid wall securely meeting the front edges of the left base wall, the floor of said base, and the right base wall, the surfaces of the rear base wall and the rear lid wall being substantially coplanar; a plurality of vents disposed on the left and right lid walls of said lid and on the left and right base walls of said base for venting gases and heat; a plurality of lock-down plates fixedly attached to said base for attaching said secure shelter to the ground; a handle fixedly attached to the front lid wall of said lid for lifting said lid from the closed position to the open position; a hinge attached to an interior portion of the rear base wall of said base and to an interior portion of the rear lid wall of said lid; a lifting assist mechanism utilizing a gas compression cylinder rotatably attached to said lid and to said base for aiding the operator in lifting the lid from the closed position to the open position and for softening the movement of the lid when moved from the open position to the closed position; and a locking mechanism comprising a bar-lock portion attached to the front lid wall of said lid and a pair of parallel lock receptacles attached to the left base wall of said base and to the right base wall of said base respectively, said bar-lock comprising a rectangular bar and a pair of parallel cylindrical shafts disposed at the respective ends of said bar-lock, perpendicular to said bar, which insert into said parallel lock receptacles when said lid is moved into the closed position thereby allowing the operator to lock and secure said lid and said base in the closed position.

\* \* \* \* \*